United States Patent [19]

Berbalk

[11] 3,795,161

[45] Mar. 5, 1974

[54] TOOL MACHINE FOR MACHINING CRANKSHAFTS

[75] Inventor: Hermann Berbalk, Goppingen, Germany

[73] Assignee: Gebruder Boehringer Gesellschaft mit Beschrankter Haftung, Goppingen, Germany

[22] Filed: Feb. 21, 1973

[21] Appl. No.: 334,226

[30] Foreign Application Priority Data
Feb. 29, 1972 Germany.......................... 2209622

[52] U.S. Cl............................................ 82/9, 82/20
[51] Int. Cl............................ B23b 5/18, B23b 5/00
[58] Field of Search......... 82/9, 20; 29/6; 51/73 GC

[56] References Cited
UNITED STATES PATENTS

| | | | |
|---|---|---|---|
| 2,138,964 | 12/1938 | Groene | 82/9 |
| 2,814,236 | 11/1957 | Burgsmuller | 82/20 X |
| 2,749,808 | 6/1956 | Burgsmuller | 82/20 X |
| 3,308,695 | 3/1967 | Hagerman | 82/20 X |

Primary Examiner—Harrison L. Hinson
Attorney, Agent, or Firm—Schlesinger, Fitzsimmons & Schlesinger

[57] ABSTRACT

The present invention relates to a tool machine of a known type in which a crankshaft is machined by a rotary annular tool having internal cutting edges located on a circle through which the crankshaft extends. The ends of the crankshaft are held by chucks mounted on columns carried by the bed of the machine. A slide on this bed movable in a direction parallel to the crankshaft carries the tool holder which is movable on the slide to a cutting position in which said circle is located in a tangential relationship to the pin of the crankshaft being cut and to a loading and unloading position in which said circle is brought to co-axial relationship with the chucks. When the tool holder is in this position, it may be moved by the slide to a position close to one of the columns in which the tool surrounds a substantially cylindrical projection on the column carrying the chuck. In this position the tool and the tool holder are located laterally of the workpiece permitting the same to be easily released from the chucks and unloaded from the machine which may then be charged with the next crankshaft.

4 Claims, 4 Drawing Figures

TOOL MACHINE FOR MACHINING CRANKSHAFTS

BACKGROUND AND OBJECTS

In a prior machine tool for machining crankshafts by means of a rotary annular tool having internal cutting edges located on a circle surrounding the crankshaft the slide carrying the tool holder was so confined within the space between the two columns carrying the chucks that in any position of the slide the tool surrounds the crankshaft held by the chucks. As a result, the loading and unloading of the crank was a difficult and time-consuming job requiring considerable skill. More particularly it was necessary, after the slide carrying the tool holder had been moved close to one of the columns to release the crankshaft from the chuck on the other column and to move this other column on the bed away from the crankshaft so as to enable the operator to pull the crankshaft out of the tool, after the other chuck had been opened.

It is an object of the present invention to provide a machine tool of the type having a bed, two columns and a slide on the bed carrying a tool holder for a rotary annular tool provided with internal cutting edges in which a slide can be moved on the bed to a position in which the tool and the tool holder no longer surround the crankshaft thus enabling the operator to unload the crankshaft and to replace it by a new crankshaft without first moving a column and without withdrawing the crankshaft from the interior space of the annular tool.

It is old in the art of machining a crankshaft by means of a rotary annular tool having internal cutting edges located on a circle to dimension the circle large enough to permit the substantially cylindrical work holder including a chuck to pass through the tool. This is shown in the German Pat. No. 1,910,404 describing an installation in which a plurality of substantially cylindrical work holders each holding a crankshaft are conveyed along their common axis step by step through a plurality of stations, a rotary annular tool being provided in each station to perform cutting action therein, while the tool holder is temporarily arrested. In this prior installation the problem does not arise to facilitate loading and unloading of the crankshaft by introduction and removal thereof into and from a space confined by a pair of columns mounted on a bed and carrying chucks holding the ends of the crankshaft to be machined.

DETAILED DESCRIPTION

Further objects of the invention and the advance in the art attained thereby will appear from the description of the preferred embodiment of the invention illustrated in the accompanying drawings. It is to be understood, however, that such description serves the purpose only of illustrating rather than that of limiting or restricting the invention. Therefore, the invention is in no way limited to the details of such embodiment but is capable of numerous modifications within the scope of the appended claims.

In the drawings

Figure 1:
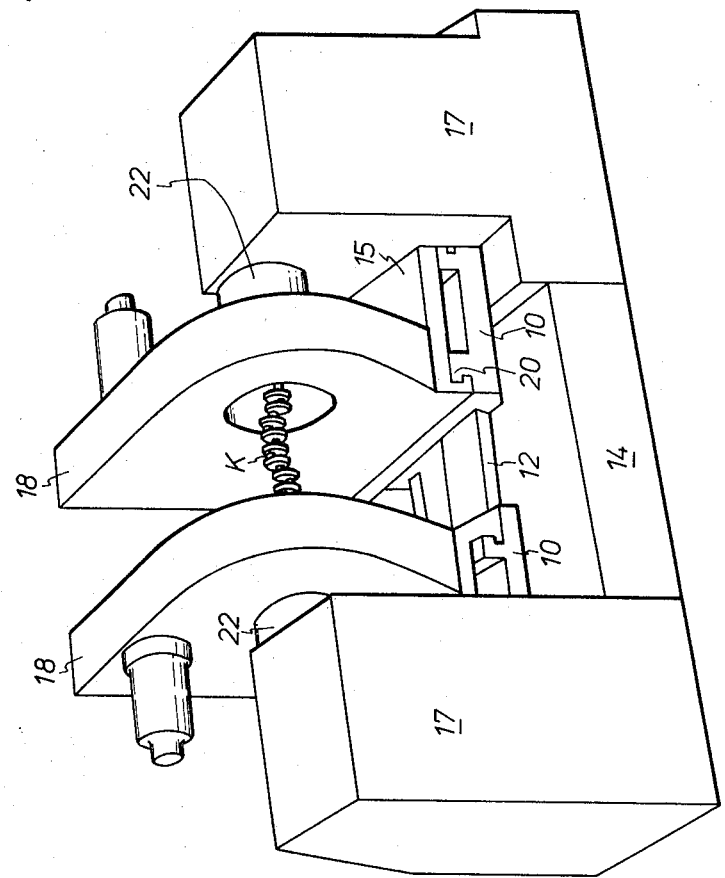
FIG. 1 is a diagrammatic perspective illustration of the novel machine tool.
Figure 2:
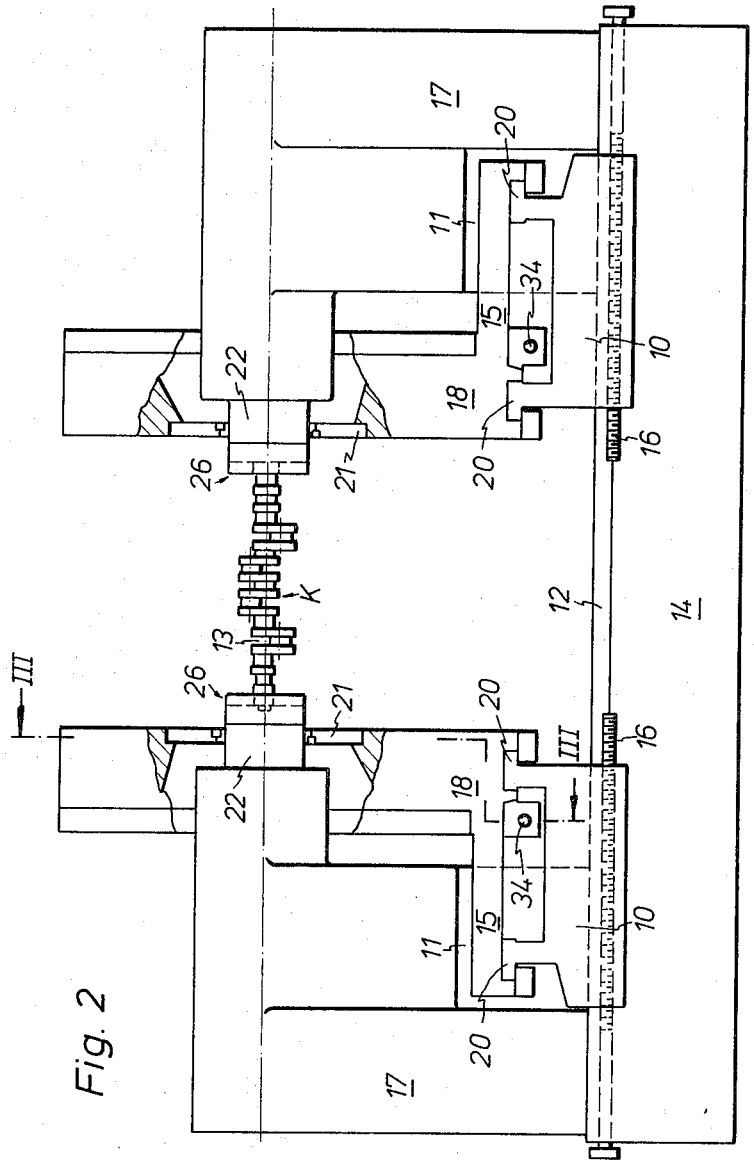
FIG. 2 is a rear view of the machine shown in FIG. 1.
Figure 3:
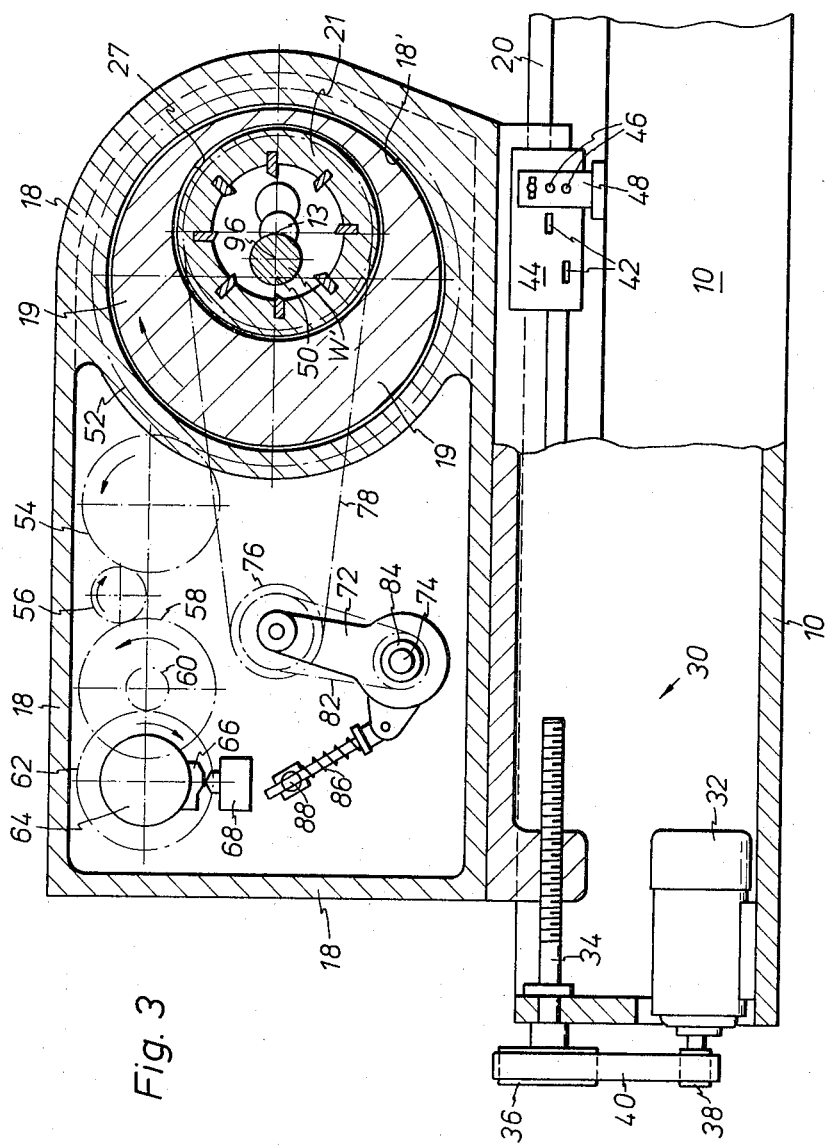
Figure 4:
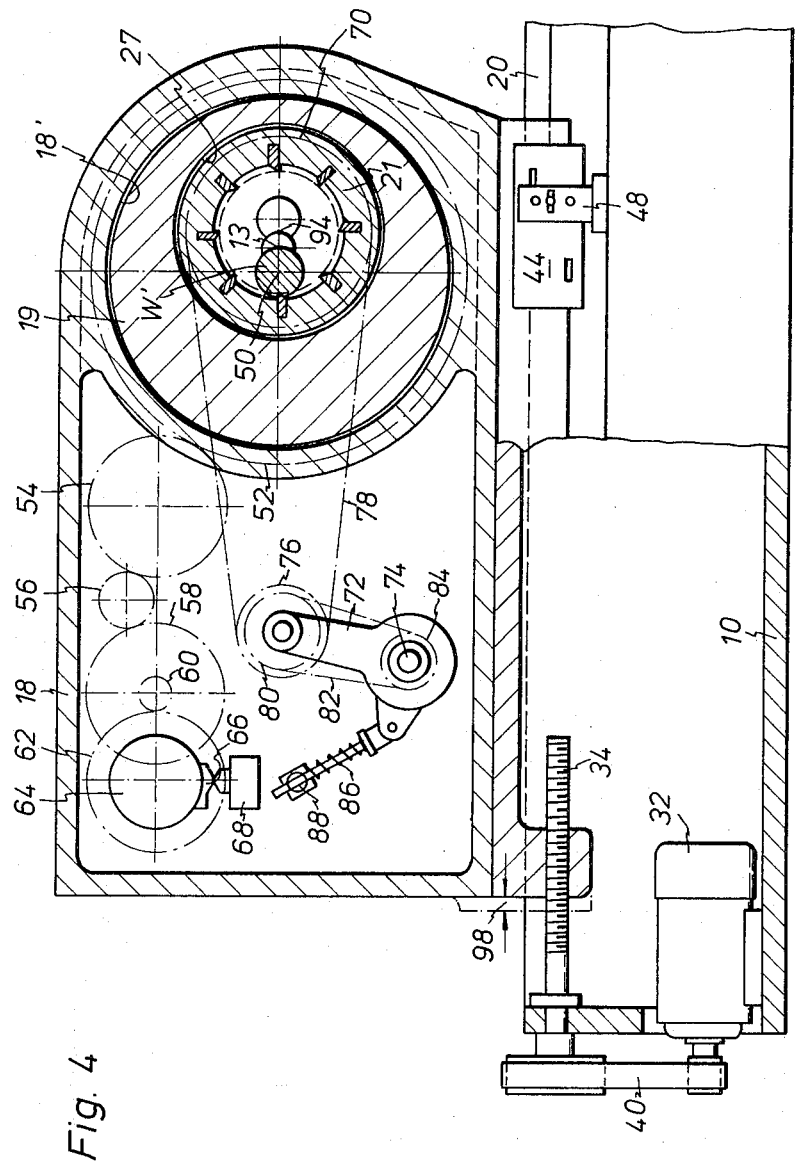

FIG. 3 represents the vertical cross-section taken along the line 3—3 of FIG. 2, the longitudinal slide, however, being in its cutting position and the transverse slide being withdrawn bringing the annular rotary tool to a position in which it surrounds the workpiece in idling condition, and FIG. 4 is a section corresponding to that of FIG. 3 illustrating the relative position of tool and workpiece after the transverse slide has been fed to cutting position.

A pair of longitudinal slides 10 are guided on a horizontal guideway 12 provided on a bed 14, each slide being movable by a threaded spindle 16 mounted within the bed for rotation and held against axial displacement therein.

The bed on each end thereof carries a column 17 for holding a chuck 26 adapted to clamp a crankshaft K to be machined in non-rotary condition. For this purpose each of the columns 10 is provided with a cylindrical projection 22 disposed co-axially to the horizontal axis 13 of the crankshaft K, such projection carrying the chuck 26 in non-rotatable condition. The axis 13 extends above the guideway 12 spaced therefrom in parallel relationship. Each longitudinal slide 10 carries a tool holder. For this purpose a horizontal transverse guideway 20 extending transversely to the guideway 12 is provided on the top face of the slide 10. The tool holder 18 provided with a wide foot 15 is slidably guided on the transverse guideway 20 and is displaceable thereon by feeding means 30 mounted on the longitudinal slide 10 and comprising an electrical feed motor 32, a feed spindle 34 and belt connecting means 36, 38 and 40 connecting the shaft of motor 32 with the feed spindle 34. This feed spindle 34 extends parallel to the guideway 20 and is mounted in the longitudinal slide 10 for rotation but held against axial displacement thereon. The spindle threadingly engages a horizontally extending threaded bore provided in a downward projection of the tool holder 18. Adjustable abutments 42 are mounted on a supporting plate 44 fixed to the tool holder 18, such abutments serving to cooperate with limit switches 46 fixed to a bracket 48 attached to the longitudinal slide 10. The feed motor 32 is so controlled by these limit switches as to be operative to move the tool holder 18 between a first position illustrated in FIG. 3 and a second position illustrated in FIG. 4. In the first position a tool 21 is co-axially disposed with respect to the common axis 13 of the cylindrical projections 22. In the second position shown in FIG. 4 the circle coinciding with the cutting edges of the tool is tangentially located to the crankshaft pin being machined, as described in detail hereinafter.

The tool holder 18 is provided with an internal cylindrical bearing face 18' having a bearing axis 50 extending parallel to the axis 13 in FIG. 3 in a common horizontal plane with the same. An eccenter body 19 is rotatably mounted in this bearing face 18'. This body is provided with external gear teeth. The pitch circle 52 of these gear teeth is shown in FIGS. 3 and 4. These teeth serve the purpose of cooperatively connecting the eccenter body with a feed motor not shown by a suitable gear transmission. The pitch circles of the gears of this transmission denoted by 54, 56, 58, 60 and 62 are shown in FIGS. 3 and 4. The feed motor drives the gear 56 and drives a rotary control cam 64 rigidly connected with the gear 62. The ratio of transmission of the gearing 52 – 62 is so chosen that the control cam 64 rotates synchronuously with the eccenter body 19. The cam has a projection 66 actuating a limit switch 68 mounted on the tool holder 18 and operative to control the feed motor not shown. The cam will stop the feed motor any time when the eccenter body 19 reaches the angular position shown in FIGS. 3 and 4. A starter switch is so connected with the limit switch 68 that upon depression it will start the feed motor causing the same to drive gear 56, eccenter body 19 and control cam 64. Eccenter body 19 and control cam 64 will then perform one complete revolution whereupon the cam projection 66 depresses the limit switch 68 thereby arresting the feed motor, the eccenter body 19 and the control cam 64.

The eccenter body 19 is provided with an internal cylindrical bearing face 27 eccentrically disposed with respect to the bearing face 18' and serving to rotatably hold the annular tool 21. This tool is provided with internal cutting blades. Moreover the tool is provided with sprocket teeth having a pitch circle 70 shown in FIG. 4. A horizontal shaft 74 extending parallel to axis 50 is journalled in the tool holder 18 and provided with an arm 72 freely pivotally mounted on shaft 74. This arm carries a sprocket 76 connected by a chain 78 with the sprocket teeth 70 of the annular tool 21. The sprocket 76 is connected by a chain 82 with a sprocket 84 fixed to the shaft 74. This shaft 74 is driven by an electric motor not shown.

A pressure spring 86 acts on the arm 72. This spring is braced against a bolt 88 fixed to the tool holder 18 and exerts pressure on a projection of the hub of the arm 72 thereby holding the chain 78 in taut condition during rotation of the eccentric body 19.

The cutting edges of the cutting blades of the annular tool 21 are located on a circle concentric to the bearing face 27 of the eccenter body 19, the diameter of such circle being somewhat larger than that of the cylindrical projections 22 of the columns 17 and larger than the largest transverse dimension of the chuck 26 and of the workpiece K.

When the cam projection 66 assumes the angular position shown in FIGS. 3 and 4, the eccenter body 19 is in an angular position in which the axis 94 of its internal bearing face 27 is positioned within the same horizontal plane as are the axes 13 and 50.

When the tool holder 19 assumes the position illustrated in FIG. 3, the axis 13 of the crankshaft coincides with the axis 94 of the internal bearing face 27 of the eccenter body 19. Consequently the workpiece 18 is disposed concentrically within the interior of the annular tool 21. In this event, the axis 50 of the internal bearing face 18' of the tool holder 18 is spaced a certain distance from the axis 96 of the crankshaft of the workpiece illustrated in section in FIGS. 3 and 4. In the embodiment shown in the drawings, the axes 96 and 13 are disposed in the same horizontal plane even though that is not a critical requirement. It is necessary, however, that the axes 50 and 96 are located in the same horizontal plane.

When the two tool holders assume the idling position shown in FIG. 3 in which the axes 13 and 94 coincide, the longitudinal slides 10 can be withdrawn into the position shown in FIG. 2. During this withdrawal, both the annular tools 21 move across the chucks 26 to positions in which they surround the cylindrical projections 22 of the columns 17. As a result, the workpiece K and the two chucks 26 are freely accessible. Therefore, the operator can conveniently load or unload the workpiece. If desired, automatic loading means may be installed to perform this work.

For machining the workpiece, the two longitudinal slides 10 are moved to the position in which the two annular tools 21 are located between the same transverse vertical planes which confine the space accommodating the bearings of the crankshaft to be machined which may be the line bearings or the crank bearings. Thereafter, the motor driving shaft 74 and the annular tool is put in operation in each tool holder thus driving the tool 21 about its axis 94 with such a rotary velocity that the blades will move with the proper cutting speed. Moreover the motor 32 is put in operation and the starter key is depressed causing this motor to advance the tool holder 18 from the idling position in FIG. 3 to the cutting position shown in FIG. 4.

Let it be assumed that the tool holder illustrated in FIGS. 3 and 4 is to machine a crank pin of the crankshaft K. In order to show clearly in FIG. 2 which pins are the crank bearings and which are the line bearings, the workpiece is shown in FIG. 2 in angular position angularly displaced by 90° from that shown in FIGS. 3 and 4.

For the purpose of machining a crank bearing of the crankshaft shown in FIGS. 3 and 4, the tool holder 18 is advanced the distance shown at 98 in FIG. 4 thereby bringing axis 50 of the eccenter body 19 into the position in which it coincides with the axis 96 of the crank bearing to be machined. During this feed, the cutter blades 90 are plunge-fed into the crank pin W' of the workpiece starting from the left until the cross-section of the pin has received the non-symmetrical shape shown in FIG. 4. Thereupon the starter switch is actuated causing the cam 64 and the eccenter body 19 to perform one complete revolution in clockwise direction. During this revolution the axis 94 of the annular tool 21 orbits on a circular path disposed concentrically to the coinciding axes 96 and 50. First, the axis 94 moves starting from the position shown in FIG. 4 in downward direction and towards the left and then upwards again and towards the left past axis 50 and then upwardly and towards the right and again downwardly until it arrives again in the position of FIG. 4.

During the milling operation the cutting edges of the blades describe arcuate paths which envelop the pin W' and thus result in a circular cross-section of the pin. Thereafter the cam projection will actuate the limit switch 68 to thereby stop the eccenter body 19.

Thereupon the feed motor 32 is started in reverse direction thus moving the tool holder 18 from the milling position of FIG. 4 back to the idling position in FIG. 3. Thereafter the longitudinal slides 10 are so moved that the annular tools 21 are brought into registry with the next crank pin bearings to be machined whereupon the milling operation is repeated. This mode of operation is continued until all of the bearing faces of the workpiece have been machined. Thereafter the two longitudinal slides 10 are moved back to the position of FIG. 2 whereupon the workpiece is unloaded and replaced by a new workpiece.

Should the necessity arise, a bracing block may be placed upon the guideway 12 between the slides 10 and may be clamped in position for the purpose of bracing the crankshaft K between the chucks 26.

The opposed faces of the columns 17 may be provided with recesses 11 closely above the bed 14 and the longitudinal slides 10, when withdrawn, may slip into such recesses 11. In this manner the length of the machine may be reduced in relation to the length of the guideway 12. The wide feet 15 of the tool holders 18 enter the recesses 11 of the column 17, when the longitudinal slides 10 are withdrawn, and afford a reliable bracing of the tool holders on the longitudinal slides 10.

The recesses 11 and the cylindrical projections 22 of the columns 17 have the effect that these cylindrical projections 22, the two columns 17 and the bed 14 constitute a rigid C-shaped frame of rugged structure.

The preferred embodiment of the invention described hereinabove is capable of numerous modifications. Thus it is possible to produce a relative rotary motion between the tool holder and the crankshaft by imparting rotation to the crankshaft rather than to the eccenter body. In this event the axis 94 of the rotary tool 21 machining the crank bearing of the workpiece must orbit about the work axis 13 in synchronism with the axis of the crank bearing. That is known per se.

Moreover, it is possible to mount the C-shaped body formed by the elements 22, 17 and 14 in a position in which the axis 13 extends vertically.

It is well known to perform the machining of the individual bearings of the crankshaft proceeding from one end thereof to the other and to clamp the crankshaft during the machining of each bearing by chucking the bearing machined just previously as disclosed for instance in German Pat. No. 1,803,703. This process cen be practised with the machine described hereinabove. In this event the chuck 27 remote from the bearing first machined must be opened any time after a bearing has been machined thus permitting the workpiece to relax. In relaxing the end of the crankshaft will assume a new position and must be rechucked in this new position. This end of the crankshaft is the one provided with a flange. This flange is held between jaws having clamping faces extending transversely to the axis 13. Such chucks are known per se.

The embodiment of my invention described hereinabove is capable of numerous other modifications within the scope of the appended claims.

What I claim is:

1. A machine tool for machining a crank shaft comprising a bed provided with a guideway, a pair of columns mounted thereon in spaced relationship, a pair of substantially cylindrical projections each being provided on one of said columns in spaced relationship to said guideway, chucks carried by said projections for chucking the ends of the crankshaft to be machined, the common axis of said projections and of said chucks extending parallel to said guideway, a slide on said guideway, a tool holder on said slide for holding an annular rotary tool thereon of the type having internal cutting edges located on a circle surrounding a clearance space large enough to accomodate the crankshaft or said projections, mounting means connected with said slide and with said tool holder for mounting the latter movably on said slide for movement into various positions including a first position providing for co-axial relationship of said circle and said projections, and a second position providing for a tangential relationship of said circle to the crankshaft portion being machined, a motor on said tool holder for imparting rotation to said tool about its axis, and means for effecting a relative rotary motion between said tool holder and the crankshaft, when said slide is in said second position, said slide and said columns being so shaped as to enable said slide to move to positions in which said tool surrounds one of said projections.

2. The machine tool claimed in claim 1 further comprising a second slide on said guideway, a second tool holder on said slide for holding a second annular rotary tool thereon of the type having internal cutting blades surrounding a circular clearance space large enough to accommodate said projections, mounting means connected with said slide and with said second tool holder for mounting the latter movably on said second slide for movement into various positions defined in claim 1, a motor on said second tool holder for imparting rotation to said second tool about its axis, and means for effecting a relative rotary motion between said tool and the crankshaft, said second slide and said columns being so shaped as to enable said slide to move into a position in which said second tool surrounds one of said projections.

3. A machine tool as claimed in claim 2 in which said bed, said columns and said projections on said columns constitute a C-shaped rigid frame surrounding said slides.

4. A machine tool as claimed in claim 1 in which said slide is provided with a transverse guideway extending between said first mentioned guideway and said axis transversely thereto and in which said mounting means comprise a second slide movably guided on said second guideway and provided with a bearing having a bearing axis, an eccenter body rotatably journalled in said bearing and forming a second bearing having an axis parallel to but spaced from said bearing axis, said second bearing accommodating said annular rotary tool, actuating means for moving said second slide on said first mentioned slide, first driving means to impart rotation to said eccenter body, and second driving means including said motor for imparting rotation to said tool, said first driving means constituting said means for effecting a relative rotary motion between said tool holder and the crankshaft, when said slide is in said second position.

* * * * *